United States Patent [19]
Ul-Haque et al.

[11] Patent Number: 5,595,719
[45] Date of Patent: Jan. 21, 1997

[54] PROCESS FOR STEAM REFORMING OF HYDROCARBONS

[75] Inventors: Israr Ul-Haque, Baulkham Hills; David L. Trimm, Watsons Bay, both of Australia

[73] Assignee: Haldor Topsoe A/S, Denmark

[21] Appl. No.: 887,610

[22] Filed: May 22, 1992

Related U.S. Application Data

[62] Division of Ser. No. 743,120, Aug. 9, 1991, abandoned.

[30] Foreign Application Priority Data

Aug. 9, 1990 [DK] Denmark ................................. 1898/90

[51] Int. Cl.⁶ ............................... C01B 3/26; C01B 31/18
[52] U.S. Cl. ...................... 423/418.2; 423/654; 502/242; 502/246; 502/249; 502/303; 502/328; 502/335; 502/337
[58] Field of Search ................................. 423/654, 418.2

[56] References Cited

U.S. PATENT DOCUMENTS

| | | | |
|---|---|---|---|
| 2,112,387 | 3/1938 | Sweeney et al. | 423/654 |
| 2,119,566 | 6/1938 | Williams | 423/654 |
| 3,542,696 | 11/1970 | Mulaskey | 502/242 X |
| 3,567,411 | 3/1971 | McMahon | 423/654 |
| 3,666,412 | 5/1972 | Sowards | 423/6.54 |
| 3,791,993 | 2/1974 | Rostrup-Nielsen et al. | 423/654 |
| 3,812,196 | 5/1974 | Uchiyama et al. | |
| 3,840,475 | 10/1974 | Davis | 502/227 |
| 3,960,773 | 6/1976 | Bertus et al. | |
| 4,060,498 | 11/1977 | Kawagoshi et al. | |
| 4,071,437 | 1/1978 | Engelhard et al. | |
| 4,191,664 | 3/1980 | McArthur | 502/335 |
| 4,216,123 | 8/1980 | Banks et al. | 423/654 |
| 4,284,531 | 8/1981 | Simpson et al. | 502/242 X |
| 4,504,593 | 3/1985 | Trinh Dinh et al. | |
| 4,602,000 | 7/1986 | Dupin et al. | 502/335 |

FOREIGN PATENT DOCUMENTS 1502302  3/1978  United Kingdom.

*Primary Examiner*—Wayne Langel
*Attorney, Agent, or Firm*—Ostrolenk, Faber, Gerb & Soffen, LLP

[57] ABSTRACT

A process for the production of hydrogen and/or carbon monoxide rich gases by steam reforming of a hydrocarbon feedstock, the process comprising the step of contacting the hydrocarbon feedstock and steam with a catalyst comprising nickel as a main catalytic component, a refractory carrier material for the nickel, and at least one catalytic element for the steam reforming of the hydrocarbon feedstock, the element being selected from the group consisting of germanium, tin, lead, arsenic, antimony and bismuth.

6 Claims, 8 Drawing Sheets

Ni Ni-Bi catalysts

Ni Ni-As catalysts

PROCESS FOR STEAM REFORMING OF HYDROCARBONS

This is a divisional of application Ser. No. 07/743,120, filed on Aug. 9, 1991, now abandoned.

The present invention is related to the production of hydrogen and/or carbon monoxide rich gases by steam reforming of hydrocarbons. In particular, the present invention involves a novel nickel comprising reforming catalyst for use in the steam reforming of a hydrocarbon feedstock.

In the known processes for the production of hydrogen and/or carbon monoxide rich gases a mixture of hydrocarbons and steam and/or carbon dioxide is passed at elevated temperature and pressure through a reactor packed with a catalyst, mainly consisting of nickel as the active catalytic component.

Hydrocarbon feedstocks suitable for steam reforming are for instance natural gas, refinery off-gases, propane, naphtha and liquified petroleum gases. Taking methane as an example, the reactions, which take place can be represented by the following equations:

(1) $CH_4 + H_2O \rightarrow CO + 3H_2$ $(-\Delta H°_{298} = -206.4 \text{ kJ/mole})$ (2) $CH_4 + CO_2 \rightarrow 2CO + 2H_2$ $(-\Delta H°_{298} = -234.4 \text{ kJ/mole})$ (3) $CO + H_2O \rightarrow CO_2 + H_2$ $(-\Delta H°_{298} = 41.2 \text{ kJ/mole})$ In addition to the reforming reactions (1) and (2), certain carbon forming reactions may occur as follows:

(4) $CH_4 \rightarrow C + 2H_2$ $(-\Delta H°_{298} = -75.9 \text{ kJ/mole})$ (5) $2CO \rightarrow C + CO_2$ $(-\Delta H°_{298} = 173 \text{ kJ/mole})$ The carbon, thereby, formed is detrimental in several ways. It decreases the activity of the catalyst by blocking its active sites. Carbon formation may further cause spalling and pulverization of the catalyst particles, resulting in increasing pressure drop over the catalyst bed and hence discontinuations of the reforming operation due to clogging of the reactor.

It is well known to prevent carbon formation on the catalyst by increasing the steam to hydrocarbon ratio or by reducing the molecular weight of the feedstock to reduce the potential for carbon formation. However, an increased steam to hydrocarbon ratio leads to reduced yields of CO by shifting more carbon monoxide over to carbon dioxide. Thus, in order to maintain $CO/H_2$-production at the desired production rate, larger amounts of catalyst and feedstock are required, which depreciates the economy of the reforming process.

Various attempts have been made to overcome carbon deposition without affecting the optimum steam to hydrocarbon ratio. A method of preventing carbon formation during steam reforming processes for the preparation of reducing gases with a high reduction potential is mentioned in GB patent No. 2,015,027. By the disclosed process, a feed gas rich in methane is reformed over a supported nickel catalyst in the presence of 2 to 10 ppm by volume sulphur or sulphur compounds in the feed. Thereby, the presence of sulphur in the feed gas counteracts carbon formation and ensures satisfactory reforming activity of the catalyst to form carbon monoxide and hydrogen.

Furthermore, several catalysts giving decreased carbon deposition have been suggested in the past. In general the prior art catalysts having a suppression effect upon carbon deposition mainly consist of nickel with alkali promotor. Disadvantages of the alkali promoted catalysts are low activity and the mobility of alkali metals, which cause migration and evaporation of the alkali promoter during the operation of the catalyst.

Steam reforming-catalysts free of alkali metals are suggested in U.S. Pat. No. 3,926,583, by which a nickel, iron or cobalt reforming catalyst is prepared by reducing a precursor comprising an intimate mixture of magnesium aluminum spinel with a mixed solid phase of the oxides of nickel, iron or cobalt, and in U.S. Pat. No. 3,791,993, disclosing a nickel, iron or cobalt, magnesium oxide reforming catalyst.

Other promoters have been suggested in the art. U.S. Pat. No. 4,060,498 mentions a steam reforming process with a silver promoted nickel catalyst on a heat-resistant oxide carrier. At an amount of silver of at least 2 mg-atoms per 100 gram of the catalyst the carbon deposition is stated to be suppressed to 10 mg/hr. or less in the steam reforming of paraffinic hydrocarbons.

We have now found that addition of small amounts of group IVa and Va metals to nickel provides a catalyst with suppressed carbon deposition during steam reforming of hydrocarbons.

Pursuant to this finding an object of the present invention is to provide an improved catalyst comprising nickel supported on refractory carrier material as its main catalytic component, the catalyst including also at least one metal selected from Group IVa and Va of the periodic table.

Preferred Group IVa and Va metals are germanium, tin, lead, arsenic, antimony and bismuth, which are included in the catalyst in an amount of between 0.1 and 30% by weight, preferably 0.2–6% by weight and most preferably 0.5–2% by weight calculated on the amount of metallic nickel in the catalyst, whereby the actual amount of the Group IVa and Va metals in the catalyst depends on the nickel surface area.

The amount of nickel in the catalyst may vary between 3 and 40% by weight, preferably between 5 and 25% by weight, calculated on the total amount of the catalyst.

According to one embodiment of the invention the catalyst is supported on a refractory carrier such as alumina, magnesia, titania, silica, zirconia, beryllia, thoria, lanthania, calcium oxide and compounds or mixtures thereof. Very suitable carriers are alumina and magnesium aluminium spinel.

The catalyst according to the invention may be prepared by coimpregnation or sequentially impregnation of the carrier material with solutions containing a soluble nickel salt and a salt of the desired metal promoter(s). The catalyst may further be prepared by coprecipitation of soluble salts of the carrier material, nickel and the desired metal promotor(s). Suitable salts are chlorides, nitrates, carbonates, acetates and oxalates, which upon heating in air form the oxides of the desired metals.

The promoted catalysts thus obtained can be used in the production of hydrogen and/or carbon monoxide rich gases by steam reforming of methane and/or higher hydrocarbons.

Accordingly, a further object of the invention is the use of the above promoted catalysts in the production of hydrogen and/or carbon monoxide rich gases by steam reforming of carbonhydrides.

The hydrogen and/or carbon monoxide rich gases obtained may be used in many processes. Mixtures of hydrogen and carbon monoxide are for instance employed in the synthesis of oxygenated hydrocarbons. An important use of hydrogen-rich gas is, furthermore, in the preparation of ammonia.

BRIEF DESCRIPTION OF DRAWINGS

The above features and aspects of the present invention will become more apparent by the following examples and drawings, in which.

EXAMPLE 1

Figure 1:
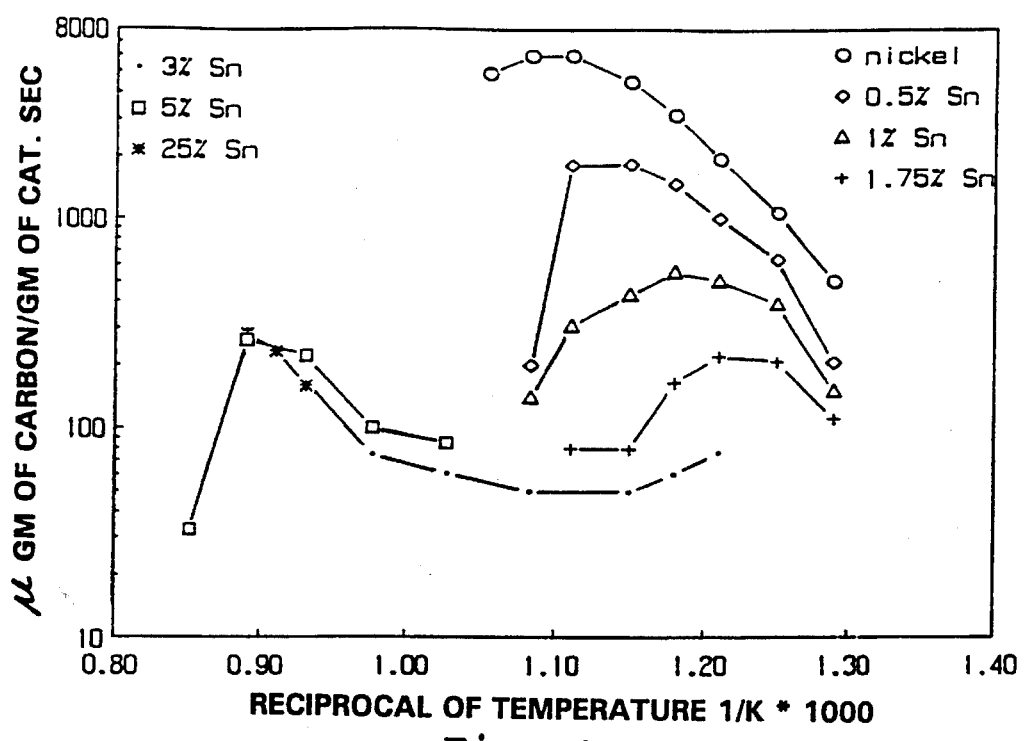
FIG. 1–8 are diagrams showing the rate of carbon formation on the catalysts according to the invention at different temperatures during reforming of hydrocarbons.

Preparation of tin promoted nickel reforming catalysts according to the invention.

The catalysts of this example were prepared by coimpregnating an alumina carrier with an aqueous solution containing nickel nitrate and tin chloride:

Impregnation solution (A):
9.9 g Ni(NO$_3$)$_2$·6H$_2$O and 0.038 g SnCl$_2$19 2H$_2$O were dissolved in 70 ml distilled water.

Impregnation solution (B):
9.9 g Ni(NO$_3$)$_2$·6H$_2$O and 0.067 g SnCl$_2$·2H$_2$O were dissolved in 70 ml distilled water.

Impregnation solution (C):
9.9 g Ni(NO$_3$)$_2$·6H$_2$O and 0.11 g SnCl$_2$·2H$_2$O were dissolved in 70 ml distilled water.

Impregnation solution (D):
9.9 g Ni(NO$_3$)$_2$·6H$_2$O and 0.19 g SnCl$_2$·2H$_2$O were dissolved in 70 ml distilled water.

Impregnation solution (E):
9.9 g Ni(NO$_3$)$_2$·6H$_2$O and 0.95 g SnCl$_2$·2H$_2$O were dissolved in 70 ml distilled water.

Impregnation solution (F):
9.9 g Ni(NO$_3$)$_2$·6H$_2$O and 0.019 g SnCl$_2$·2H$_2$O were dissolved in 70 ml distilled water.

i) Preparation of a tin promoted nickel catalyst impregnated on an alpha-alumina carrier containing 20 wt % metallic Ni (calculated on the total amount of alpha-alumina carrier and Ni) and 1 wt % metallic Sn, calculated on the amount of Ni in the catalyst.

8 g alpha-alumina with a surface area of 5 m$^2$/g were used as carrier. The carrier was crushed and sieved to a particle size of 1–2 mm and then immersed in impregnation solution (A) for about 18 hours.

After evaporation of water at 50°–60° C. with stirring, the impregnated carrier particles were dried at 125° C. for two hours. The dried particles were finally calcined in air at 500° C. for 3 hours, to decompose the impregnated metal salts to their oxides. The thus prepared catalyst precursor was treated with hydrogen at 500° C. for 2–3 hours in order to reduce the metal oxides to their metallic form and to obtain the active reforming catalyst.

ii) Preparation of a tin promoted nickel catalyst impregnated on alpha-alumina carrier containing 20 wt % metallic (Ni calculated on the total amount of alpha-alumina carrier and Ni) and 1.75 wt % metallic Sn (calculated on the amount of Ni in the catalyst).

The catalyst was prepared in the same manner as described under i), except that impregnation solution (A) was replaced by impregnation solution (B).

iii) Preparation of a tin promoted nickel catalyst impregnated on an alpha-alumina carrier containing 20 wt % metallic Ni calculated on the total amount of alpha-alumina carrier and Ni and 3 wt % metallic Sn (calculated on the amount of Ni on the catalyst).

The catalyst was prepared in the same manner as described under i) except that impregnation solution (A) was replaced by impregnation solution (C).

iv) Preparation of a tin promoted nickel catalyst impregnated on alpha-alumina carrier containing 20 wt % metallic Ni (calculated on the total amount of alpha-alumina carrier and Ni) and 5 wt % metallic Sn (calculated on the amount of Ni in the catalyst).

The catalyst was prepared in the same manner as described under i), except that impregnation solution (A) was replaced by impregnation solution (D).

v) Preparation of a tin promoted nickel catalyst impregnated on alpha-alumina carrier containing 20 wt % metallic Ni (calculation on the total amount of alpha-alumina carrier and Ni) and 25 wt % metallic Sn (calculated on the amount of Ni in the catalyst).

The catalyst was prepared in the same manner as desribed under i), except that impregnation solution (A) was replaced by impregnation solution (E).

vi) Preparation of a tin promoted nickel catalyst impregnated on alpha-alumina carrier containing 20 wt % metallic Ni (calculated on the total amount of alpha-alumina carrier and Ni) and 0,5 wt % metallic Sn (calculated on the amount of Ni in the catalyst).

The catalyst was prepared in the same manner as described under i), except that impregnation solution (A) was replaced by impregnation solution (F).

EXAMPLE 2

Preparation of tin promoted nickel reforming catalysts according to the invention supported on high surface area magnesium aluminium spinel.

The catalysts of this example containing 20 wt % metallic nickel and 1 wt %, 2.5 wt %, or 3.5 wt % metallic Sn, calculated on the amount of nickel, respectively, were prepared in similar manner to that described under Example 1, with the exception that high surface area spinel (Al$_2$O$_3$/MgO, 19 m$^2$/g) was used as carrier.

The impregnation solutions used are specified in Table 1 below:

TABLE 1

| Catalyst Composition wt % promoter with respect to metallic nickel | Impregnation solution Amount of nickel and tin salt per 70 ml distilled water |
|---|---|
| Ni(20 wt %)-Sn(1 wt %) | 9.9 g Ni(NO$_3$)$_2$ · 6H$_2$O; 0.038 g SnCl$_2$ · 2H$_2$O |
| Ni(20 wt %)-Sn(2.5 wt %) | 9.9 g Ni(NO$_3$)$_2$ · 6H$_2$O; 0.095 g SnCl$_2$ · 2H$_2$O |
| Ni(20 wt %-Sn(3.5 wt %) | 9.9 g Ni(NO$_3$)$_2$ · 6H$_2$O; 0.13 g SnCl$_2$ · 2H$_2$O |

EXAMPLE 3–7

Preparation of lead, antimony, bismuth, germanium and arsenic promoted nickel reforming catalysts according to the invention.

The bimetallic catalysts of these examples, containing 20 wt % metallic nickel and different amounts of the above promoters on an alpha-alumina carrier, were prepared by coimpregnating the carrier in a similar procedure to that from Example 1 with impregnation solutions as specified in Table 2 below:

TABLE 2

| Example | Catalyst Composition wt % promoter with respect to metallic nickel | Impregnation Solution Amount of nickel and metal salt per 70 ml distilled water |
| --- | --- | --- |
| 3.1 | Ni(20 wt %)-Pb(0.5 wt %) | 9.9 g Ni(NO$_3$)$_2$ · 6H$_2$O; 0.016 g Pb(NO$_3$)$_2$ |
| 3.2 | Ni(20 wt %)-Pb(1 wt %) | 9.9 g Ni(NO$_3$)$_2$ · 6H$_2$O; 0.032 g Pb(NO$_3$)$_2$ |
| 3.3 | Ni(20 wt %-Pb(5 wt %) | 9.9 g Ni(NO$_3$)$_2$ · 6H$_2$O; 0.16 g Pb(NO$_3$)$_2$ |
| 4.1 | Ni(20 wt %)-Sb(1 wt %) | 9.9 g Ni(NO$_3$)$_2$ · 6H$_2$O; 0.038 g SbCl$_3$ |
| 4.2 | Ni(20 wt %)-Sb(2 wt%) | 9.9 g Ni(NO$_3$)$_2$ · 6H$_2$O; 0.075 g SbCl$_3$ |
| 4.3 | Ni(20 wt %)-Sb(4 wt %) | 9.9 g Ni(NO$_3$)$_2$ · 6H$_2$O; 0.15 g SbCl$_3$ |
| 5.1 | Ni(20 wt %)-Bi(1 wt %) | 9.9 g Ni(NO$_3$)$_2$ · 6H$_2$O; 0.046 g Bi(NO$_3$)$_3$ · 5H$_2$O |
| 5.2 | Ni(20 wt %)-Bi(2 wt %) | 9.9 g Ni(NO$_3$)$_2$ · 6H$_2$O; 0.093 g Bi(NO$_3$)$_3$ · 5H$_2$O |
| 5.3 | Ni(20 wt %)-Bi(5 wt %) | 9.9 g Ni(NO$_3$)$_2$ · 6H$_2$O; 0.23 g Bi(NO$_3$)$_3$ · 5H$_2$O |
| 6.1 | Ni(20 wt %)-As(0.25 wt %) | 9.9 g Ni(NO$_3$)$_2$ · 6H$_2$O; 0.013 g(80%)H$_3$AsO$_4$ · ½H$_2$O |
| 6.2 | Ni(20 wt %)-As(0.5 wt %) | 9.9 g Ni(NO$_3$)$_2$ · 6H$_2$O; 0.026 g(80%)H$_3$AsO$_4$ · ½H$_2$O |
| 6.3 | Ni(20 wt %)-As(1 wt %) | 9.9 g Ni(NO$_3$)$_2$ · 6H$_2$O; 0.051 g(80%)H$_3$AsO$_4$ · ½H$_2$O |
| 7.1 | Ni(20 wt %)-Ge(1 wt %) | 9.9 g Ni(NO$_3$)$_2$ · 6H$_2$O; 0.06 g GeCl$_4$ |
| 7.2 | Ni(20 wt %)-Ge(5 wt %) | 9.9 g Ni(NO$_3$)$_2$ · 6H$_2$O; 0.3 g GeCl$_4$ |

EXAMPLE 8

(i) Preparation of a comparison nickel catalyst on an alpha alumina carrier (Al$_2$O$_3$, 5 m$^2$/g).

The catalyst of this example was prepared by impregnating an alumina carrier (1–2 mm particle size) with an aqueous solution of nickel nitrate containing: 9.9 g Ni(NO$_3$)$_2$. 6H$_2$O, dissolved in 70 ml distilled water.

8 g of alpha-alumina with a surface area of 5 m$^2$/g were used as carrier. The carrier was treated and the catalyst prepared by impregnating the carrier with the impregnation solution, then drying, calcinating and activating the obtained nickel catalyst in the same manner as described above in Example 1.

(ii) Preparation of a comparison nickel catalyst on magnesium aluminium spinel carrier (Al$_2$O$_3$/MgO, 19 m$^2$/g).

The catalyst was prepared in the same manner as described under i) except that the carrier of this Example was magnesium aluminium spinel (1–2 mm particle size).

EXAMPLE 9

The rates of carbon deposition on the reforming catalysts prepared under Example 1–8 were measured gravi-metrically for various values of temperature between 500°–700° C. A conventional experimental set-up comprising a heated reactor tube associated with an on-line microbalance was used for the measurements.

Samples of the catalysts (30–60 mesh) of about 20–60 mg of each sample were placed on the basket suspended from one arm of the microbalance.

The following conditions were employed, while measuring carbon formation at lower (500°–700° C.) and higher temperatures (800° C.).

Amounts of reforming catalyst used:

at lower temperatures=20 mg at higher temperatures=60 mg

The total flow rate and the concentration of the feed stream passed over the catalyst was similar at lower and higher temperatures and is given as below.

Total flow rate=290 Nml/min.

Methane=61 vol %

Steam=7 vol %

Hydrogen=20 vol %

Nitrogen=12 vol %

The carbon deposition rate was measured after reducing the catalyst samples at 500° C. for 2 hours in hydrogen.

The rate of carbon formation at the above conditions is depicted in FIG. 1–7, showing the amount of carbon (μg carbon/g catalyst·s) at different temperatures (1/K·1000) deposited on:

Ni—Sn catalysts (FIG. 1), prepared under Example 1;

Ni—Sn catalysts on spinel (FIG. 2), prepared under Example 2;

Ni—Pb catalysts (FIG. 3), prepared under Example 3.1 and 3.2;

Ni—Sb catalysts (FIG. 4), prepared under Example 4.1 and 4.2;

Ni—Bi catalysts (FIG. 5), prepared under Example 5.1–5.3;

Ni—As catalysts (FIG. 6), prepared under Example 6.1–6.3; and

Figure 2:
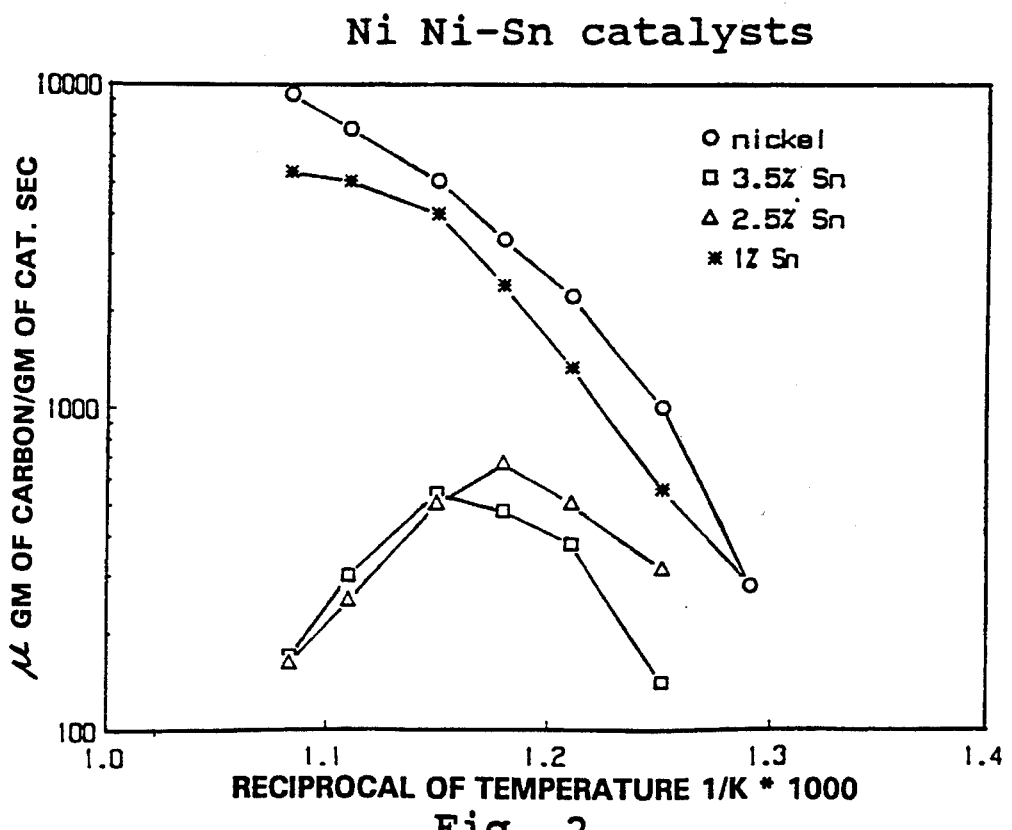
Figure 3:
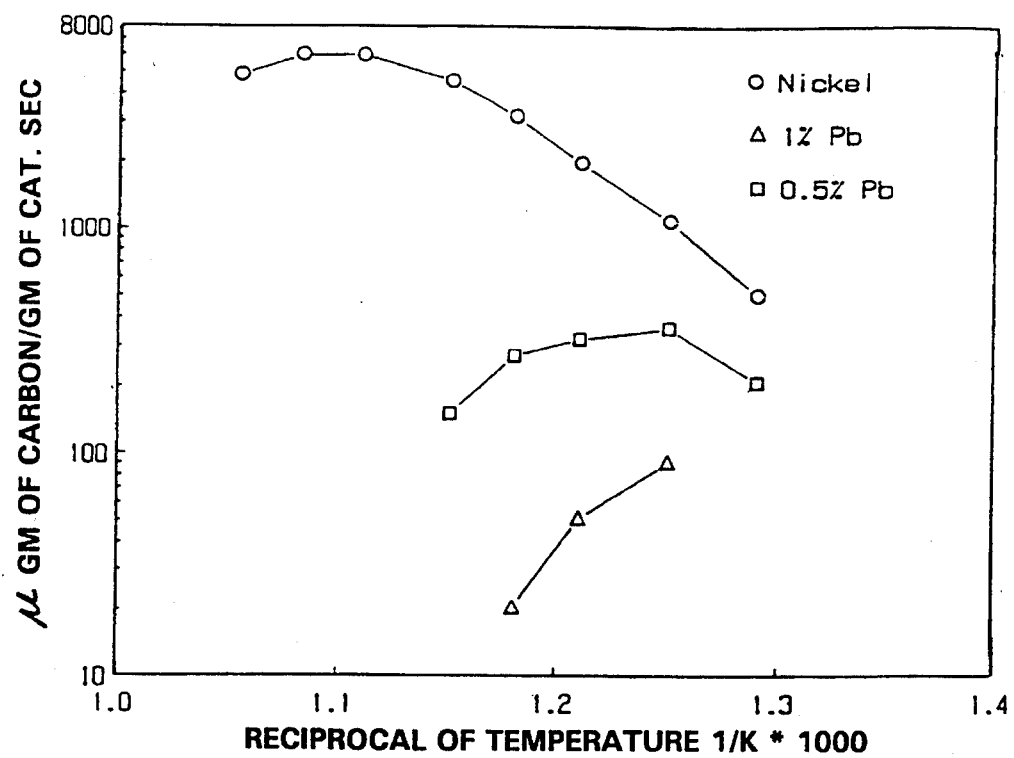
Figure 4:
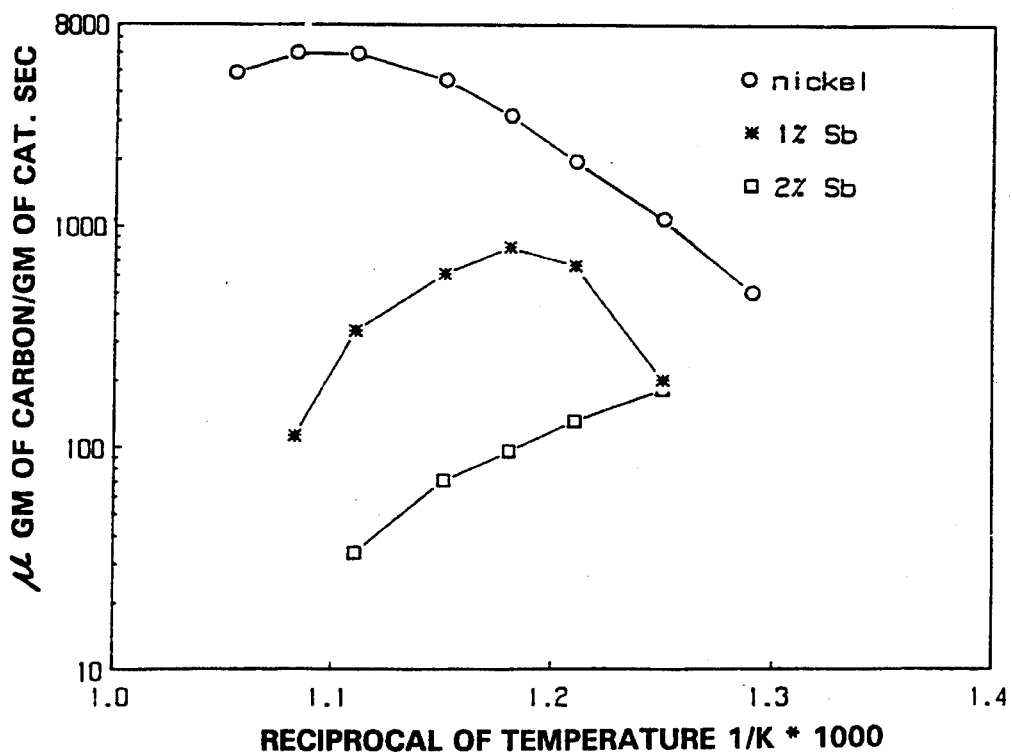
Figure 5:
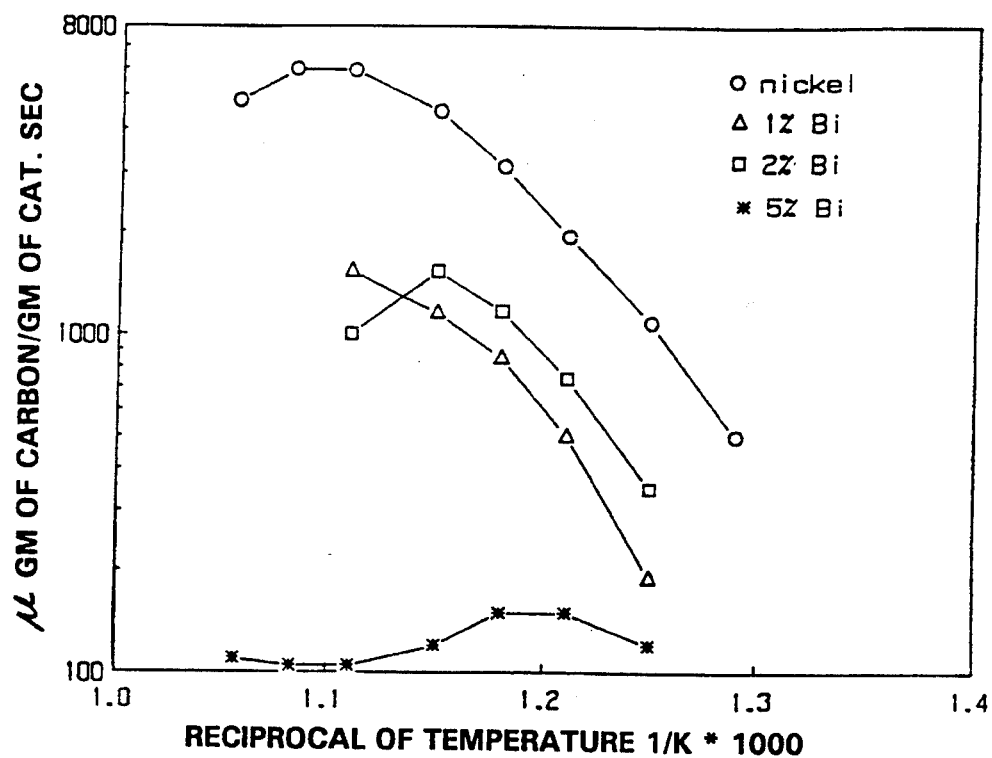
Figure 6:
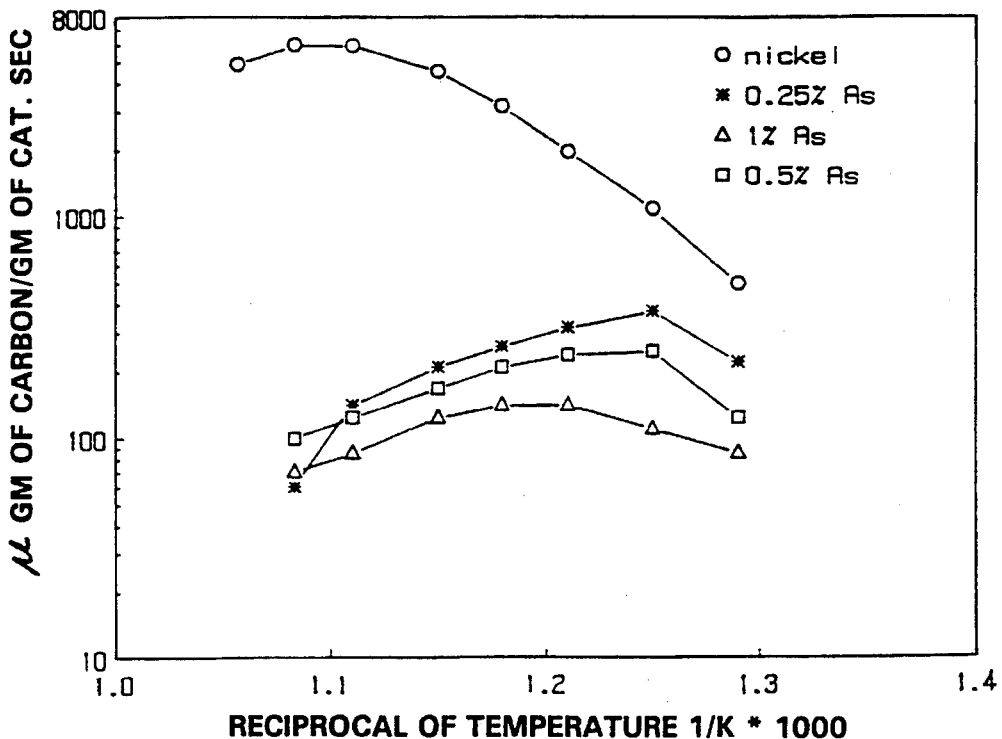

Ni—Ge catalysts (FIG. 7), prepared under Example 7.1 and 7.2;

each in comparison to the conventional nickel reforming catalyst, prepared under Example 8 i) or 8 ii) (FIG. 2).

As apparent from FIG. 1 the carbon formation rate on Ni—Sn catalysts drops in proportion to the amount of tin added. The carbon formation curves show a maximum in rate at temperature lower than that of 100% nickel. Addition of 1% tin shows a significant drop in rate of carbon formation.

A significant reduction in carbon formation rate is further observed for catalysts having 2.5% and 3.5% tin in nickel on high surface area spinel (FIG. 2).

The catalyst with 0.5% Pb in nickel (FIG. 3) is observed to deposit carbon at a moderate rate and nickel catalysts with 1% Pb retards carbon formation to a large extent. The temperature for maximum carbon deposition shifts to lower values, as compared to 100% nickel catalysts. Similar results are obtained with addition of antimony or bismuth as apparent from FIG. 4 and FIG. 5.

Small amounts of arsenic have a drastic effect on nickel catalysts activity for carbon formation. The addition of 0.25%, 0.5% and 1% arsenic has similar effects on carbon formation rate as apparent from FIG. 6.

Figure 7:
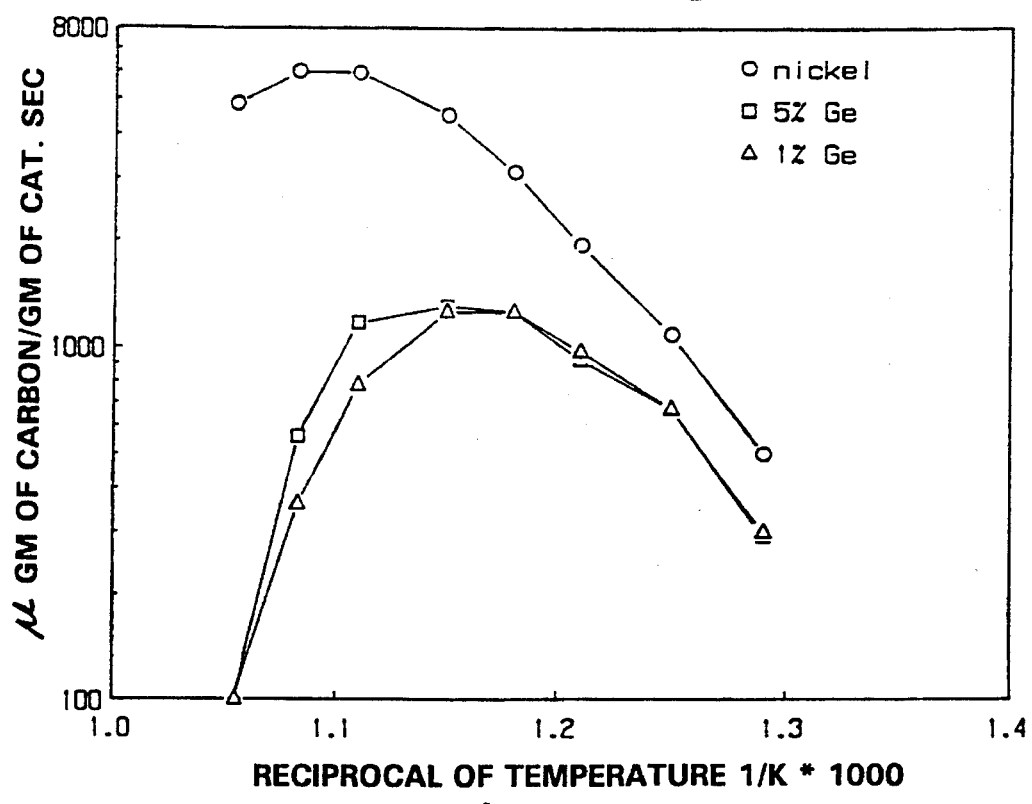

A higher content of germanium is requested to have a similar effect (FIG. 7).

EXAMPLE 10

The rate of carbon formation on tin promoted nickel reforming catalysts according to the invention was further studied at steam reforming of higher hydrocarbons.

The catalyst used for this study was prepared by sequential impregnation of Ni and Sn on a magnesium-spinel carrier ($Al_2O_3$/MgO, 20 $m^2$/g, 4 mm particle size).

2.00 g of the carrier were immersed in an excess of 92 wt % aqueous $Ni(NO_3)_2 \cdot 6H_2O$ solution at 80° C. After about one hour the impregnated carrier was separated by filtration, dried and calcinated in air at 450° C. for 30 min.

This procedure was repeated once and the catalyst now contained about 20 wt % metallic nickel on the carrier.

The nickel impregnated carrier was immersed in 20 ml of an aqueous solution of 0.036 g $SnCl_2 \cdot 2H_2O$ and impregnated for 18 hours at ambient temperature, then dried and calcined in air at 450° C. for 30 min.

The final catalyst contained about 20 wt % Ni and 1 wt % Sn, calculated on the amount of Ni in the catalyst.

The catalyst was activated by reduction in pure hydrogen at 600° C. for about 2 hours.

The rate of carbon deposition on the catalyst was measured during steam reforming of butane in a similar procedure to that described under Example 9.

The following conditions were employed, while measuring carbon formation at 450° C. to 750° C. with an increase of temperature by 0.3° C./min.

110 mg of the Ni—Sn catalyst were loaded on the basket of the microbalance. The increase of temperature together with the increase of weight were recorded by a pen-plotter.

The total flow rate and concentration of the feed stream passed over the catalyst was as given below:

Total flow rate=360 Nml/min.

Butane=2.9 vol %

Steam=23.1 vol %

Hydrogen=4.6 vol %

Nitrogen=69.4 vol %

Pressure=atmospheric

In a similar procedure carbon formation was measured on a comparison Ni-catalyst prepared as described above with the exception that no Sn was impregnated on the carrier.

Figure 8:
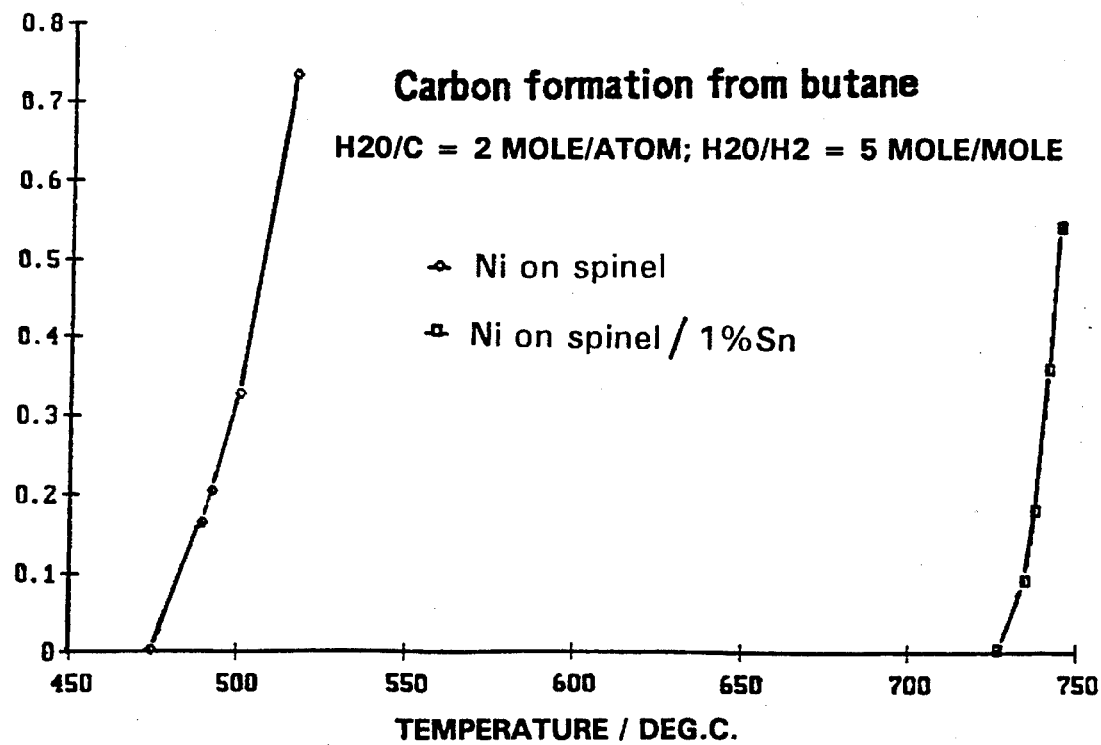
Figure 9:
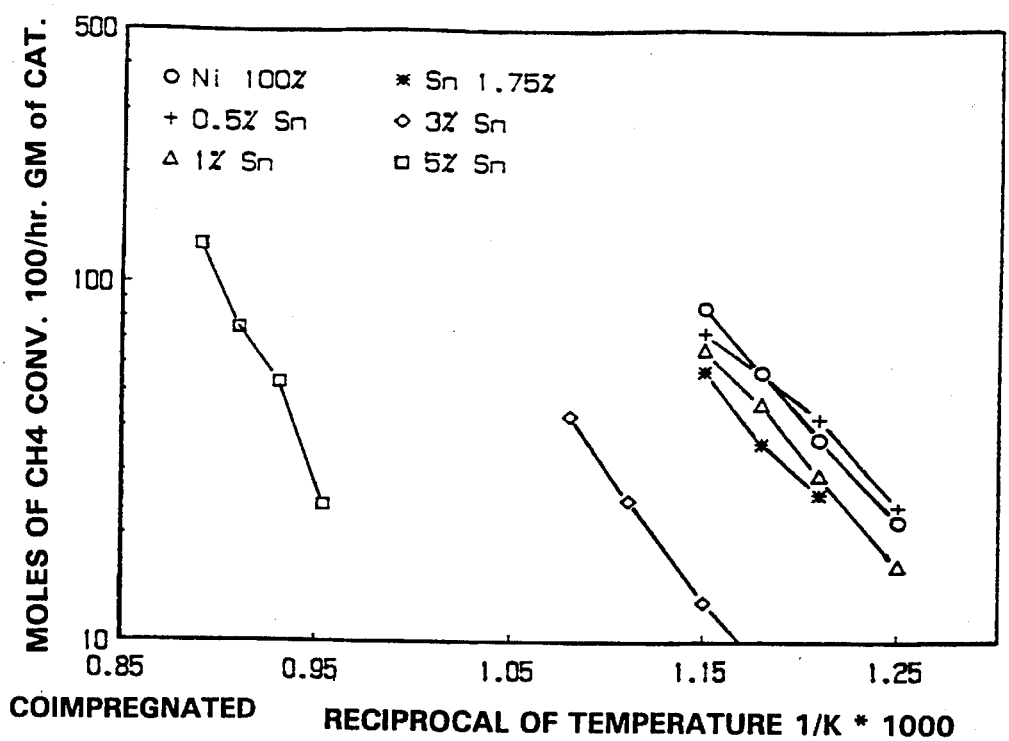
FIG. 9–15 show the activity of the catalysts according to the invention at steam reforming of methane.

The results obtained by the above measurements are depicted in FIG. 8, showing the rate of carbon formation on the catalysts.

As apparent from FIG. 8 the onset of carbon formation during steam reforming of butane is increased from about 475° C. to about 725° C. by addition of 1 wt % Sn in the nickel catalyst. This demonstrates a highly improved resistance to carbon formation on the tin promoted catalysts according to the invention during reforming of higher hydrocarbons.

EXAMPLE 11b

Catalytic activity of promoted catalysts according to the invention in the conversion of methane by steam reforming.

To determine the steam reforming activity of the catalysts a stainless steel reactor tube of 8 mm inner diameter was used. The reactor was placed in an electric furnace. Inside the reactor tube a thermocouple was positioned at the bottom of the catalyst bed. The thermocouple was attached to a furnace controller and to a digital temperature indicator.

The reactants and products were analysed by gas chromatography. Samples of 40 mg catalysts (30–60 mesh) diluted with 2060 mg of inactive alpha alumina were loaded as fixed bed in the reactor tube.

The following process conditions were used to determine the steam reforming activity for the catalyst between 525° C. and 625° C.

Total flow of feed gas was maintained at about 300 Nml/min with following percentage concentration:

Methane=27 vol %

Steam=8 vol %

Hydrogen=32 vol %

Helium=33 vol %

The catalysts were reduced at 500° C. for 2–3 hours in pure hydrogen, whereafter hydrogen was replaced with the feed gas in which methane was added after about 5–10 min. The activity was then measured at 525° C., 550° C., 575° C., 600° C. and 625° C.

Figure 10:
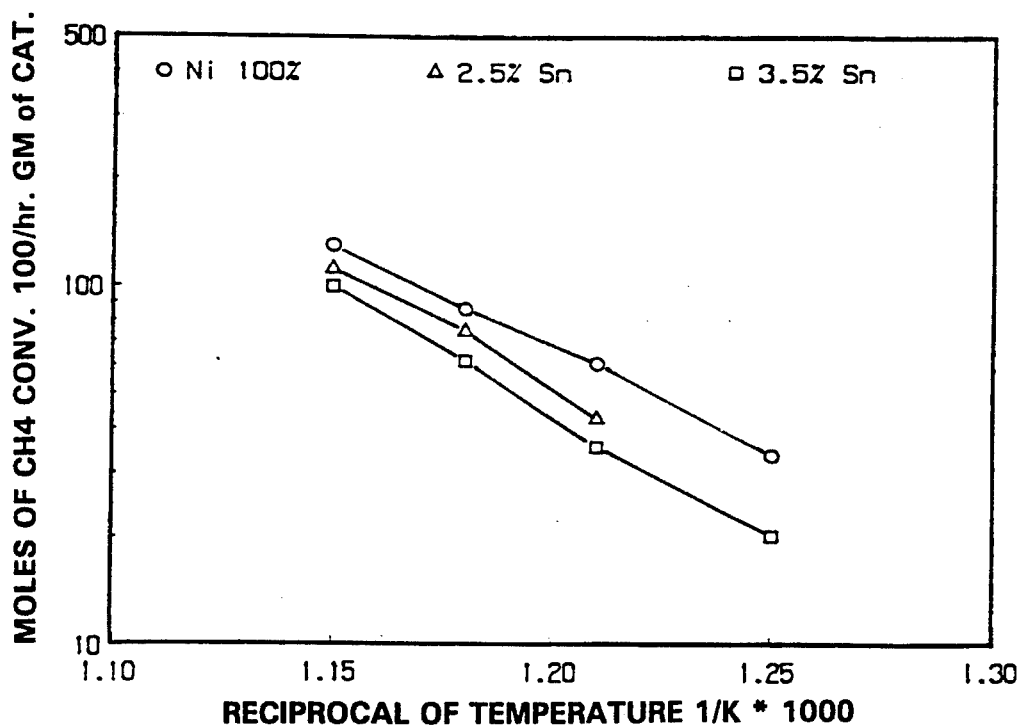
Figure 11:
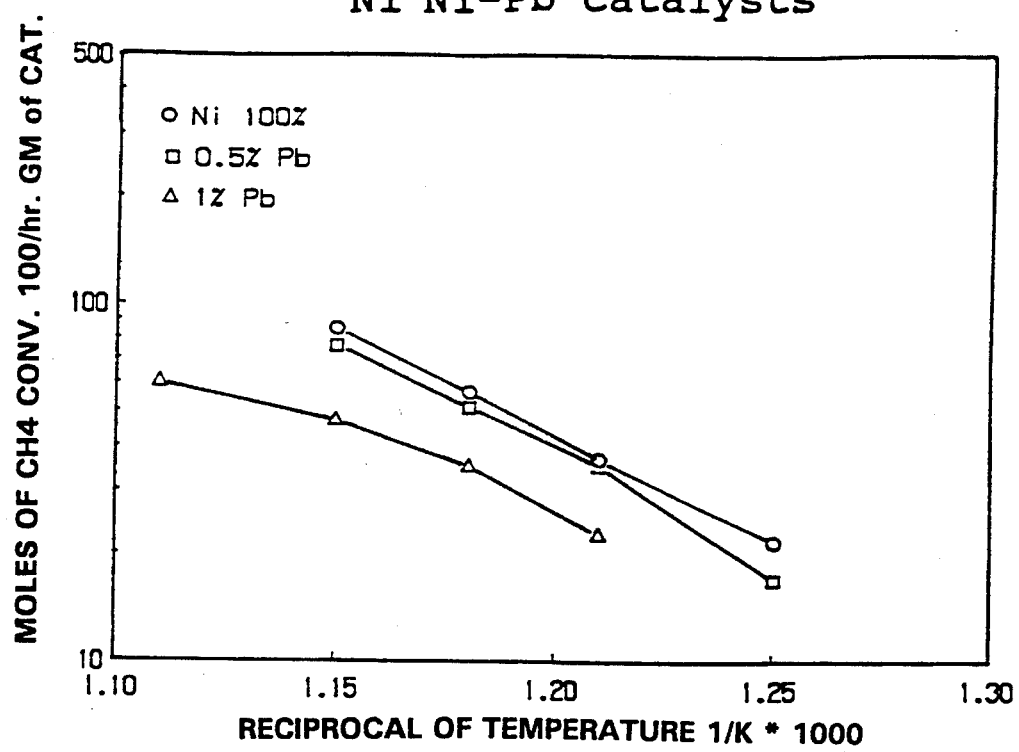
Figure 12:
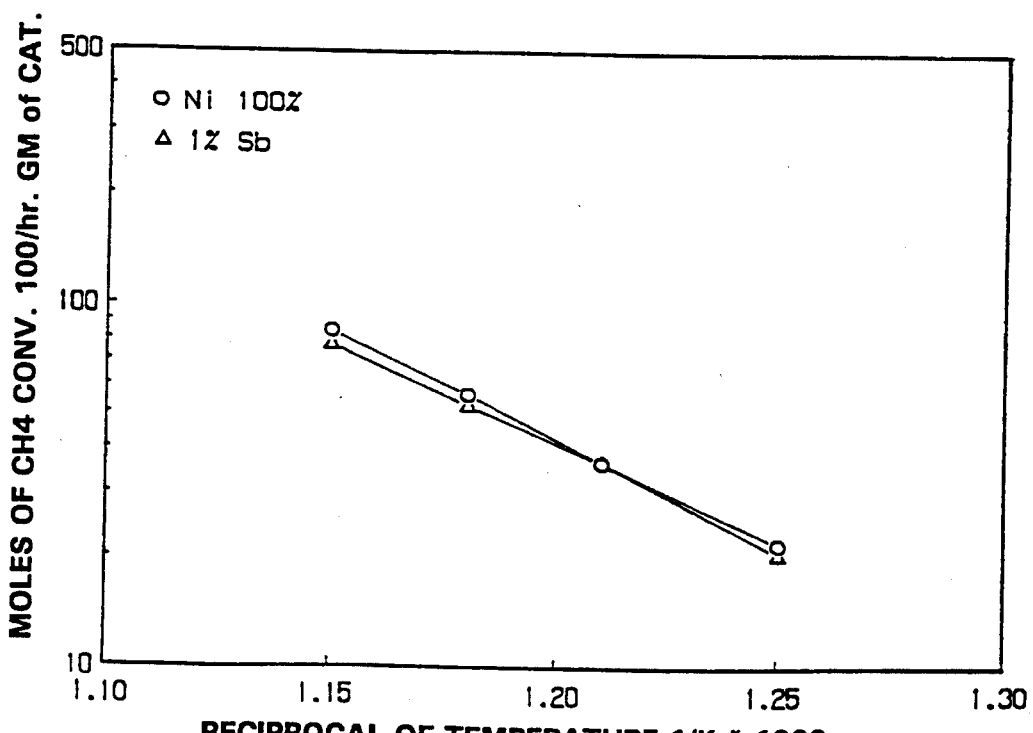
Figure 13:
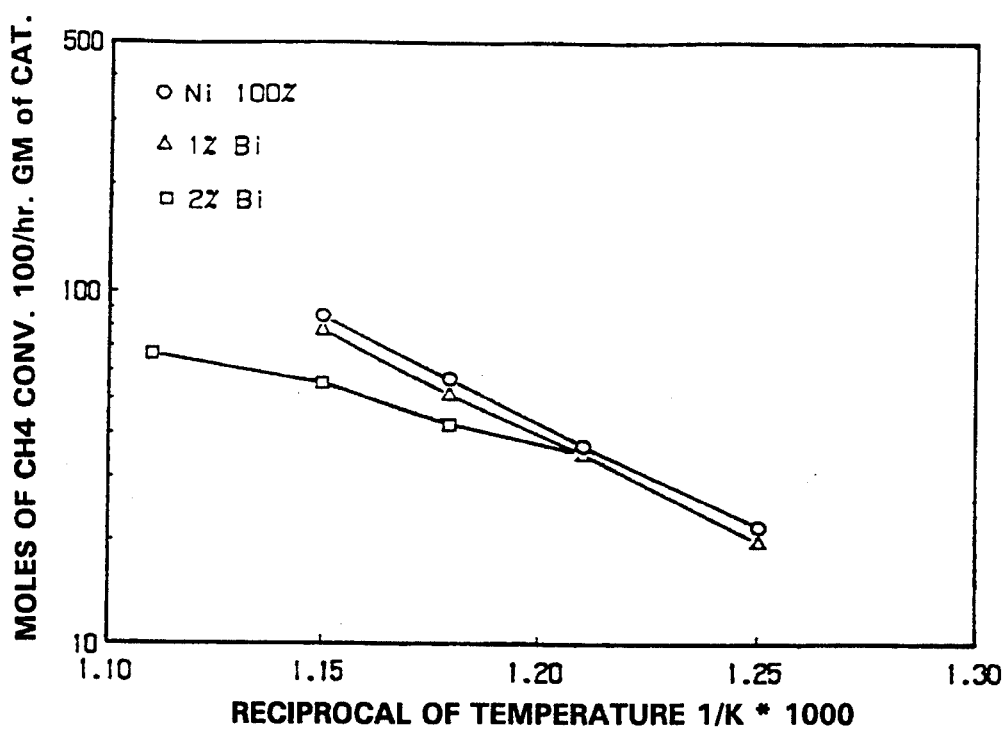
Figure 14:
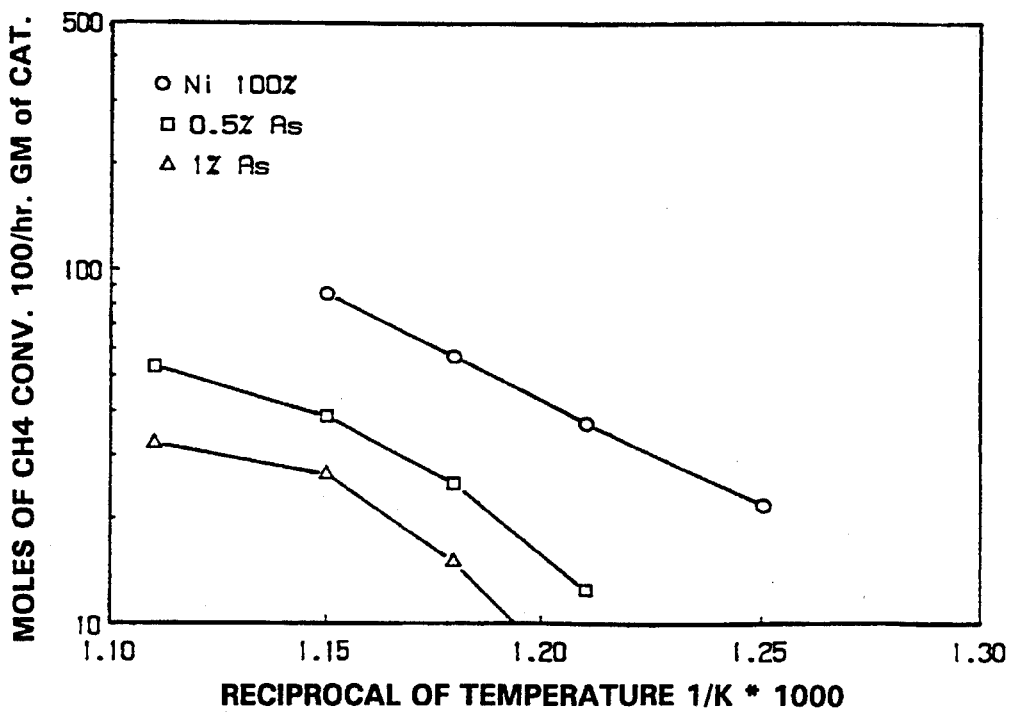
Figure 15:
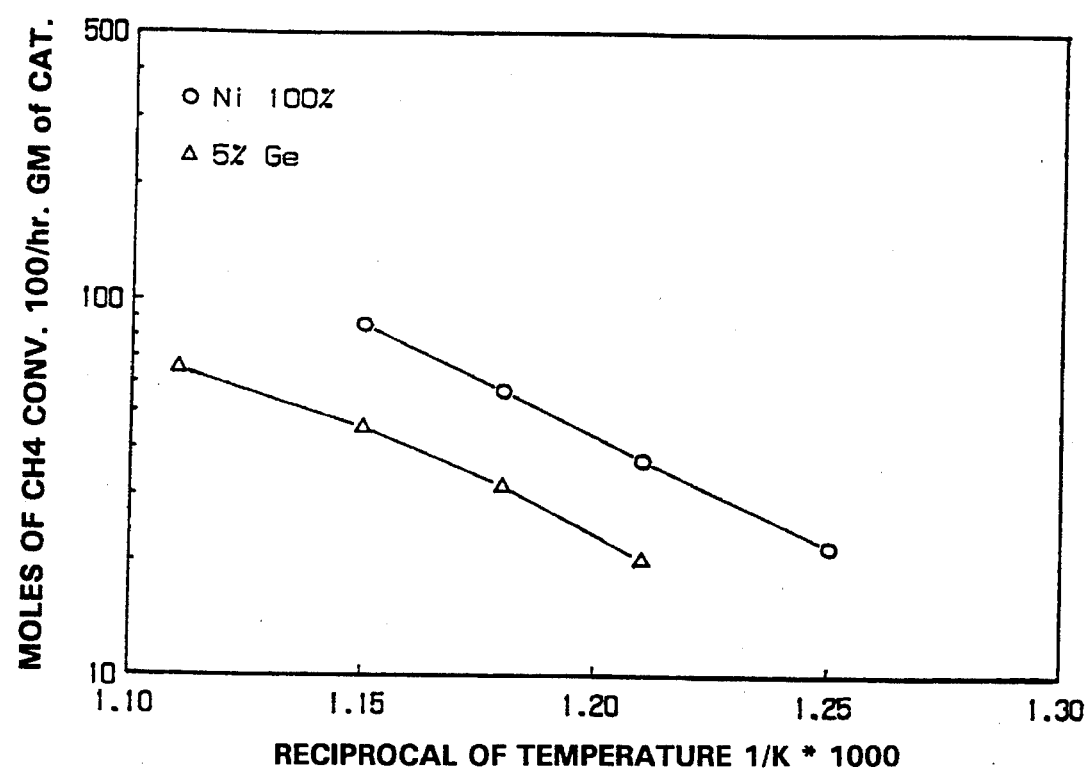

The results from the activity test are presented in FIGS. 9–15, showing the amount of methane converted to carbon oxide (moles of $C_4$ converted to $CO+CO_2$/g catalyst/hr.) at the above temperatures (1/K·1000) by use of:

Ni—Sn catalysts (FIG. 9), prepared under Example 1;

Ni—Sn catalysts (FIG. 10), prepared under Example 2;

Ni—Pb catalysts (FIG. 11), prepared under Example 3.1 and 3.2;

Ni—Sb catalysts (FIG. 12), prepared under Example 4.1;

Ni—Bi catalysts (FIG. 13), prepared under Example 5.1 and 5.2;

Ni—As catalysts (FIG. 14), prepared under Example 6.1 and 6.3;

Ni—Ge catalysts (FIG. 15), prepared under Example 7.2; each in comparison to the conventional nickel reforming catalyst, prepared under Example 8 i) or 8 ii) (FIG. 10).

As seen from the figures the steam reforming activity of nickel catalyst containing small amount of Sn, Pb, Sb, and Bi promoters are similar to that of 100% nickel. Metals such as arsenic and germanium reduce the activity of nickel catalysts, but small amounts of these metals have only a mild effect on steam reforming when compared to the nickel catalyst.

It is to be understood that the foregoing description is given only to illustrate and exemplify the present invention, changes and alterations, such as addition of minor amounts of other metals to nickel further to the mentioned metals, are contemplated as within the scope of the present invention, which is limited only by the claims which follow.

We claim:

1. A process for the production of hydrogen and/or carbon monoxide rich gases by steam reforming of a hydrocarbon feedstock, the process comprising the step of contacting the hydrocarbon feedstock and steam with a catalyst comprising nickel as a main catalytic component, a refractory carrier material for the nickel, and at least one catalytic element for the steam reforming of the hydrocarbon feedstock, the element being selected from the group consisting of arsenic, antimony and bismuth.

2. The process of claim 1, wherein the element comprises between 0.1 and 30% by weight of the catalyst based on the amount of nickel in the catalyst.

3. The process of claim 2, wherein the element comprises between 0.2 and 6% by weight of the catalyst based upon the amount of nickel in the catalyst.

4. The process of claim 3, wherein the element comprises between 0.5 and 2% by weight of the catalyst based upon the amount of nickel in the catalyst.

5. The process of claim 1, wherein the refractory carrier material is selected from the group consisting of alumina, magnesia, titania, silica, zirconia, beryllia, thoria, lanthania, calcium oxide and compounds or mixtures thereof.

6. The process of claim 1, wherein the hydrocarbon feedstock comprises higher hydrocarbons.

\* \* \* \* \*